United States Patent
Yoshidome

(12) 
(10) Patent No.: US 10,701,228 B1
(45) Date of Patent: Jun. 30, 2020

(54) SCANNING SYSTEM WITH AUTOMATIC PAPERCLIP REMOVER

(71) Applicant: Kyocera Document Solutions Inc., Osaka (JP)

(72) Inventor: Gin Yoshidome, San Ramon, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/455,405

(22) Filed: Jun. 27, 2019

(51) Int. Cl.
| G06K 15/00 | (2006.01) |
| H04N 1/00 | (2006.01) |
| B65H 1/08 | (2006.01) |
| B65H 7/14 | (2006.01) |

(52) U.S. Cl.
CPC ........... *H04N 1/00628* (2013.01); *B65H 1/08* (2013.01); *B65H 7/14* (2013.01); *H04N 1/00251* (2013.01); *H04N 1/00604* (2013.01)

(58) Field of Classification Search
CPC ........... H04N 1/00628; H04N 1/00251; H04N 1/00604; B65H 7/14; B65H 1/08
See application file for complete search history.

(56) References Cited

U.S. PATENT DOCUMENTS

| 6,634,633 | B1 * | 10/2003 | Maruchi | ............... B25C 11/00 |
| | | | | 254/28 |
| 8,651,473 | B2 | 2/2014 | Suzuki et al. | |
| 2008/0246291 | A1 * | 10/2008 | Tonami | ............... B42F 1/00 |
| | | | | 294/65.5 |
| 2010/0067071 | A1 | 3/2010 | Rozenfeld et al. | |
| 2012/0251288 | A1 * | 10/2012 | Suzuki | ............... B65H 3/06 |
| | | | | 414/796.5 |

FOREIGN PATENT DOCUMENTS

JP 2001-063910 A 3/2001

* cited by examiner

*Primary Examiner* — Moustapha Diaby
(74) *Attorney, Agent, or Firm* — James Judge

(57) ABSTRACT

A scanner for removing paperclips from a sheaf of papers, with a paper lifting tray operable to move the sheaf of papers in a vertical direction, a pushdown bar configured to move in a vertical direction and make contact with the sheaf of papers on the paper lifting tray and apply a force in an opposite direction from the direction in which the paper lifting tray moves, the force being sufficient to hold the sheaf of papers in place, and with a removal bar configured to move in a direction that is coplanar with the paper lifting tray and orthogonal to the vertical direction, wherein the removal bar is configured to come into contact with the sheaf of papers and push a paperclip off of the sheaf of papers.

20 Claims, 13 Drawing Sheets

SCANNING SYSTEM WITH AUTOMATIC PAPERCLIP REMOVER

FIELD OF THE INVENTION

The present disclosure relates to a scanning system with a paperclip remover to remove paperclips from documents and scan them.

BACKGROUND

Currently, when a paperclip is used to hold documents together, a person must manually remove the paperclip from the document in order to process the document using a scanner. A scanner can include a scanner, fax machine, copy machine, etc., and can further be connected to a network such as a local area network (LAN), or the Internet, for example. While removing a paperclip from one sheaf or file of papers can be inconvenient, repeating this process hundreds or thousands of times can be very tedious and time consuming.

For example, if an organization, for example a hospital, is digitizing paper records and wishes to scan thousands of documents, it can cost substantial amounts of time and money to manually remove paperclips from the files and papers before scanning. Automating the paperclip removal process can greatly increase the efficiency and throughput of digitizing documents with a scanner. The present disclosure has been made in light of the above issues.

SUMMARY

In an embodiment of the disclosure, a scanner is used to remove paperclips from a sheaf of documents. The sheaf of documents is initially held together by a paperclip and is placed on a lifting tray via a push bar, conveyer belt system, or by a person. Then the lifting tray can move upwards, and a pushdown bar can descend to apply pressure on the sheaf of papers so that the sheaf of papers will not move and will be secured while the paperclip is removed.

Next, a removal bar moves towards the top (or bottom) edge of the paper where the paperclip is attached to the sheaf of papers. The removal bar can include a pusher plate that is configured to contact and slide under an edge of the paperclip so that the paperclip will clamp down on the pusher plate of the removal bar instead of the sheaf of papers. The removal bar will then continue to move until the paperclip is completely detached from the sheaf of papers. Then, the pushdown bar, removal bar and lifting tray will return to their resting positions and the sheaf of papers can be sent to the next processing step.

BRIEF DESCRIPTION OF THE DRAWINGS

The following drawings illustrate examples of various components of embodiments of the disclosure disclosed herein and are for illustrative purposes only.

DETAILED DESCRIPTION

Figure 1:
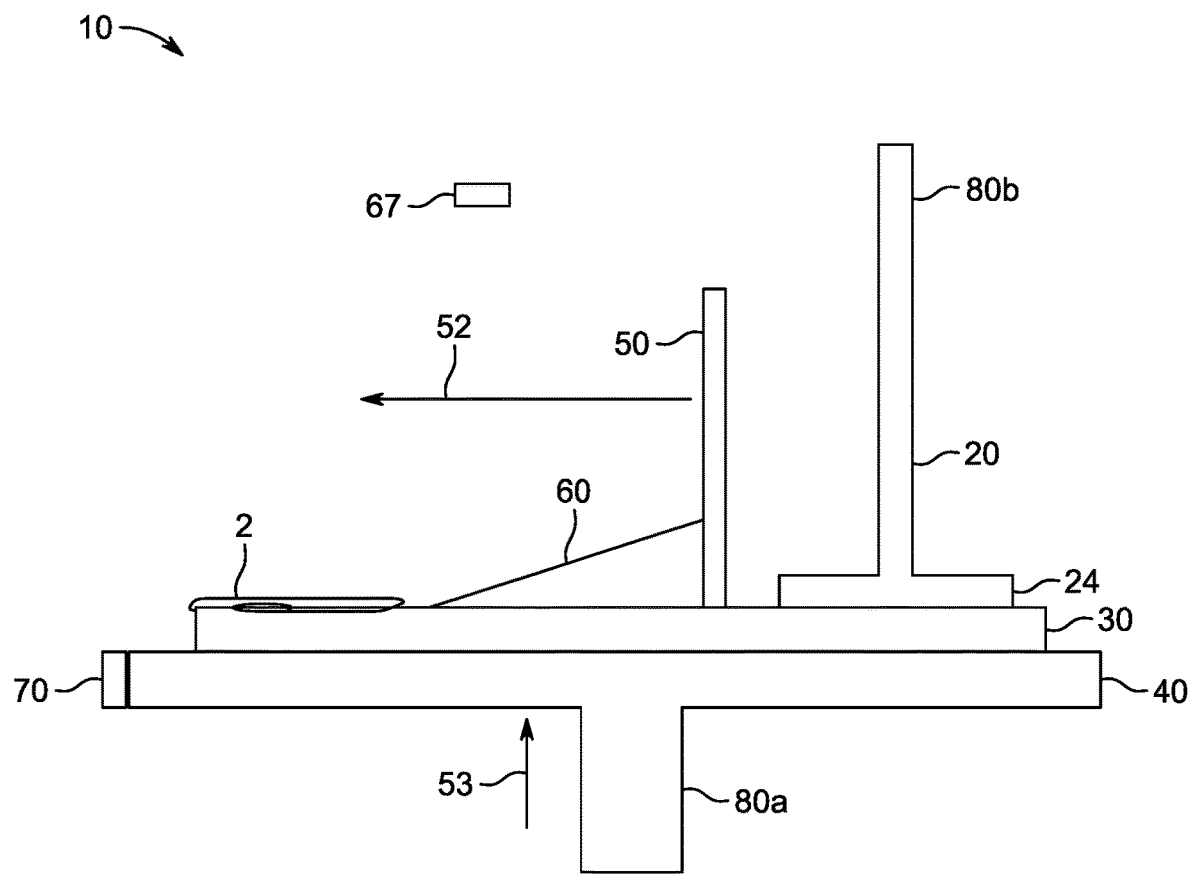
FIG. 1 shows a side view of the disclosure according to a first embodiment.

Throughout the description of the drawings, the same reference characters in the various drawings represent the same element unless otherwise noted. Therefore, not all reference characters of every drawing will be mentioned in order to avoid repetition.

The inventor has created a method and apparatus for quickly and efficiently removing paperclips from a sheaf of documents. A stack of papers, also referred to as a sheaf of papers or paper sheaf, held together by a paperclip can be placed on a lifting tray by an individual or via conveyer belt system or other method. Then the lifting tray can move the sheaf of papers upwards and a pushdown bar can descend vertically to apply pressure on the sheaf of papers so that the sheaf of papers will be securely held in place. Subsequently, a removal bar with a pusher plate will move towards the top edge of the paper where the paperclip is attached. In some embodiments, the removal bar can move in a vertical direction and descend onto the sheaf of papers, while in other embodiments, the removal bar simply moves in a lateral direction and not a vertical direction.

In some embodiments, the pusher plate of the removal bar is inserted between the paperclip and sheaf of papers and can then remove the paperclip from the sheaf of papers. This can be done by positioning the pusher plate in between the paperclip and the sheaf of papers so that the paperclip will clamp down on the pusher plate instead of the paper. Alternatively, the removal bar could push the paperclip off of the sheaf of papers. The removal bar will then move until the paperclip is completely detached from the sheaf of papers. Then, the pushdown bar and lifting tray can return to their resting positions and the sheaf of papers can be sent to the next processing step. Details of several embodiments of the disclosure will be described below.

The figures are not necessarily shown to scale and some features may be shown larger or smaller than they are with respect to other features in order to facilitate their explanation.

FIG. 1 shows a side view of a paperclip removal system 10 according to one embodiment of the disclosure. The system 10 can be internally contained within a scanner, or can be a separate unit. For example, the system 10 could be connected to a scanner and could prepare papers to be loaded into the scanner. Sheaf of papers 30, which can be one or more individual pieces of paper, is held by paperclip 2 and is placed on a lifting tray 40. Paper sheaf, sheaf of papers, and sheaf can be used interchangeably throughout this disclosure. Lifting tray 40 can be directly accessed by a human to put a sheaf on it, or can be part of a conveyor system, or other system, which automatically loads the sheaf onto the lifting tray 40. Lifting tray 40 lifts the paper in an upwards direction 53 and stops when the sheaf 30 is located at the proper position for paperclip removal. The proper position can be at the bottom of the removal bar 50 or pusher plate 60, as shown in FIG. 1 for example. Alternatively, the lifting tray 40 can stop when the lifting tray 40 or the top of the sheaf 30 reaches a predefined point. The predefined point could be determined by the system, including control circuit 1500, based on the necessary height for the system to attach paperclip 2 to sheaf of paper 30.

Sheaf 30 could include any paper compatible with and capable of being processed by a scanner. For example, paper sheaf 30 could be comprised of one or more sheets of 8.5×11 inch 20-pound bond weight paper. Similarly, paper sheaf 30 could be comprised of sheets of different sized paper, i.e. 8.5×14 inch, or different weights, i.e. 36-pound bound paper. Paper sheaf 30 could also include an ISO 216 size paper, or any other suitable size or weight of paper.

Paperclip 2 could include, for example, paperclips of varying size including types #1-4. Paperclip 2 may be comprised of any material or coating, including metal, vinyl-coated, or plastic. The structure of paperclip 2 can include any type of paperclip, including but not limited to a Niagra clip, Owl clip, Eureka clip, Weis clip, etc.

As depicted in FIG. 1, lifting tray 40 must be capable of lifting sheaf 30 into the correct position for processing. This can be done by using an electric motor or solenoid, or other type of movement mechanism (not shown). Further, the motor can be attached to a corkscrew shaft as discussed later with respect to pushdown bar 20 in FIGS. 6A and 6B. It is noted that in some embodiments, the lifting tray can remain stationary and a pushdown bar 20 can be used to descend and securely hold the sheaf of papers in place. The lifting tray 40 must be capable of sufficiently supporting and stabilizing paper sheaf 30 throughout the process of paperclip removal. This includes counteracting the force applied by the pushdown bar 20. Thus, the lifting tray 40 is preferably made from a rigid material such as aluminum, steel, plastic, etc.

Accordingly, in one embodiment, lifting tray 40 includes a flat upper surface which is larger in both length and width than paper sheaf 30 and which directly contacts paper sheaf 30. The flat upper surface of the lifting tray 40 can also be coplanar with the bottom of pusher plate 60 (discussed later). In this embodiment, lifting tray 40 also includes a vertical shaft portion 80a, from which a control system can control the position of lifting tray 40 and consequently paper sheaf 30. The lifting tray can be controlled by a control system which controls an electric motor, solenoid, or other movement means.

The control circuit 1500 (discussed later) can control the lifting tray 40 to travel up or down. In the down position, a sheaf of papers can be placed on the lifting tray. The lifting tray can then be moved upwards by the movement means until it has reached a specified position. For example, one or more switches could be positioned along the path of the lifting tray 40 and when the lifting tray 40 passes the switch, a signal could be sent to the control system indicating that the lifting tray is at a top position and the control system could then send an instruction to the movement means to stop moving the lifting tray. The same procedure could be followed to lower the lifting tray 40 into its bottom position, where paper can be loaded onto the lifting tray.

Other methods of controlling the lifting tray 40 could also be used, such as measuring a distance traveled of the lifting tray by measuring the rotation of the electric motor, solenoid, etc., or by other such techniques.

In this embodiment, paper sheaf 30 is completely supported by lifting tray 40 in the downward direction of lifting tray 40. In other embodiments, lifting tray 40 may include different sized upper surfaces capable of supporting narrower portions of paper sheaf 30 as needed for processing. Similarly, in other embodiments, lifting tray 40 may be in a different orientation such that it must support paper sheaf 30 in a non-downward direction.

FIG. 1 also shows pushdown bar 20, which applies a force in an opposite direction on paper sheaf 30 from the paper lifting tray 40 to prevent paper sheaf 30 from shifting during the paperclip removal process. Pushdown bar 20 must be capable of providing enough force to stabilize paper sheaf 30 throughout the process of paperclip removal. In one embodiment, pushdown bar 20 includes a flat lower portion or plate 24, which is smaller than paper sheaf 30 in length and which applies stabilizing pressure on paper sheaf 30. The width of the pushdown bar can be greater than or equal to the width of paper sheaf 30, however in some embodiments, the width of pushdown bar 20 is less than the width of the paper sheaf 30.

As shown in FIG. 1, pushdown bar 20 also includes an upper vertical shaft portion 80b from which the control system (not shown) can control the position of pushdown bar 20. The pushdown bar 20 can be moved by a myriad of ways including, but not limited to, an electric motor, solenoid, etc. Operation of the pushdown bar 20 will be further described with respect to FIGS. 6A and 6B. In other embodiments, flat lower portion or plate 24 of pushdown bar 20 may be smaller or larger to stabilize paper sheaf 30. Similarly, in other embodiments, pushdown bar 20 may be in a different orientation such that it must stabilize paper sheaf 30 in a different direction.

In some embodiments, lifting tray 40 may also be rotatable so as to ensure that the paperclip is oriented at a top portion of the paper sheaf 30. An optical sensor 67 (e.g. a camera) can be used to identify if and where a paperclip 2 is located on the sheaf 30. Optical sensor 67 can be located anywhere consistent with system specifications but is preferably located above paper sheaf 30 so that an unobstructed image of the sheaf 30 can be obtained. Known image recognition software, such as a trained neural network or the like, can be used to recognize a paperclip and its location on the sheaf 30. Together, the optical sensor 67, the image recognition software, and the control circuit executing the software can be collectively referred to as an image recognition system. Based on this determination, the lifting tray can be rotated such that the paperclip is positioned in a forward-facing direction. In this case, the forward-facing direction is the direction that the removal bar 50 will travel in order to remove the paperclip 2. This allows the removal bar 50 to always move in a single forward direction in order to remove paperclip 2 from the sheaf 30.

Additionally, FIG. 1 shows removal bar 50 with pusher plate 60 which is adjacent to the sheaf 30. Removal bar 50 and pusher plate 60 are part of a movement assembly 100 (discussed in FIGS. 5A and 5B). The removal bar 50 can be wider or narrower than the width of sheaf 30. If the width of removal bar 50 is less than the width of paper sheaf 30, then the paper sheaf 30 must be properly aligned with the removal bar 50 in order to ensure that the removal bar 50 intercepts and comes into physical contact with the paperclip 2, in order to push the paperclip 2 off of the paper sheaf 30.

As will be discussed in detail below, after contacting paper sheaf 30, removal bar 50 with pusher plate 60 is moved in a direction orthogonal to vertical toward paperclip 2 in direction 52. In some embodiments, the movement assembly can move in a vertical direction in order to come into contact with paper sheath 30 and disengage from paper sheath 30.

Removal bar 50 with pusher plate 60 may be designed according to the specifications necessary for any system. In one embodiment, as shown in FIG. 1, removal bar 50 is located above paper sheaf 30.

The characteristics of pusher plate 60, including length, height, orientation, and material, may also be designed to accommodate system specifications as long as pusher plate 60 includes an edge sufficient to separate paperclip 2 from the sheaf 30. In one embodiment, pusher plate 60 may have a small very acute angle on the edge opposite removal bar 50.

Figure 2:
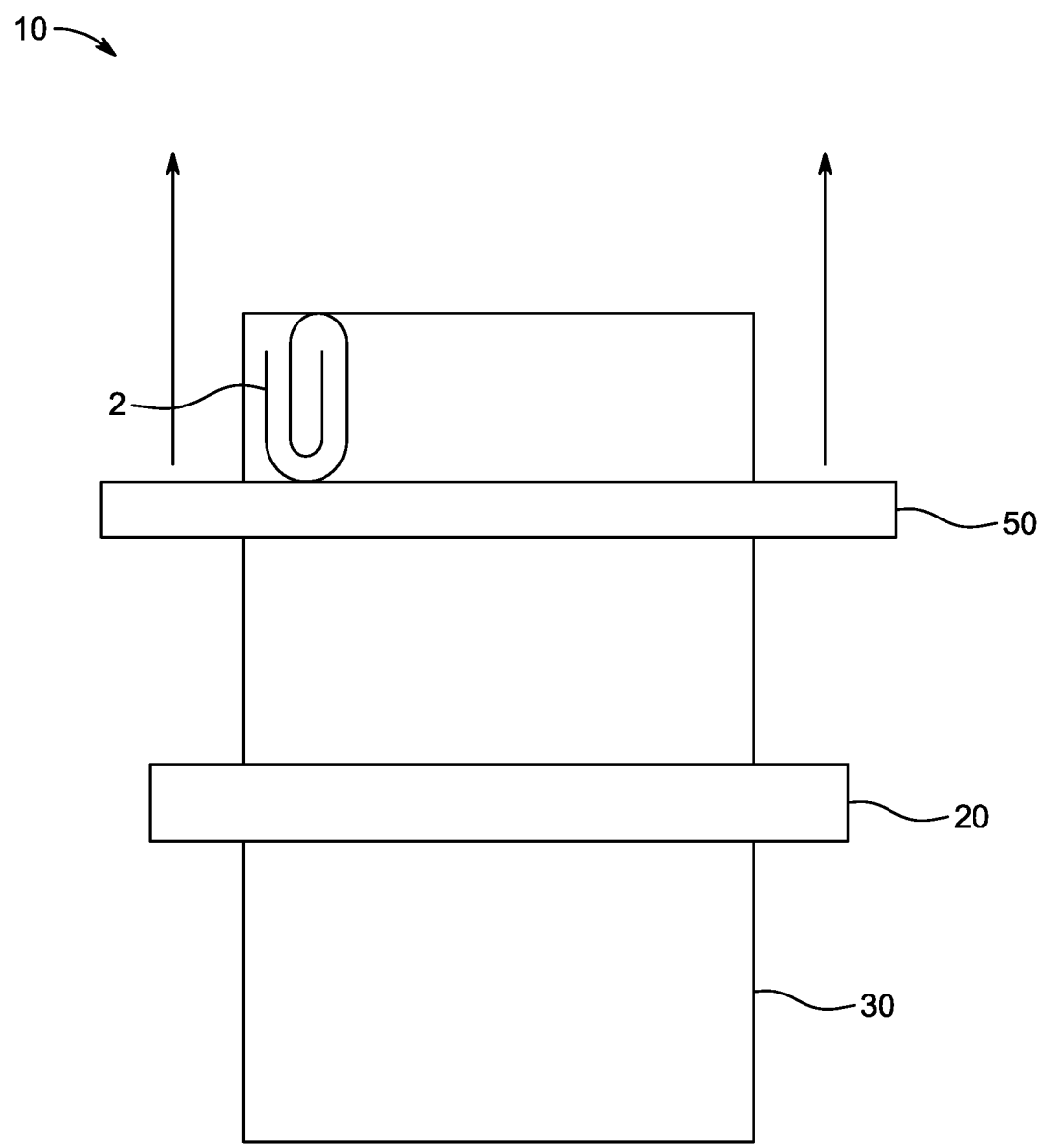
FIG. 2 shows a plan view of the disclosure according to a first embodiment.

FIG. 2 shows a plan view of paperclip removal system 10 according to the first embodiment of the disclosure. Paper sheaf 30 is shown with paperclip 2 located at one end. Pushdown bar 20 is shown above paper sheaf 30. Removal bar 50 is shown moving in the direction of paperclip 2 and pushing paperclip 2 toward paper sheath 30.

It is noted that the orientation and location of paperclip 2 is arbitrarily shown in FIG. 2, and that paperclip 2 can be located anywhere on the paper sheaf 30. That is, as shown in FIG. 2, the removal bar 50 extends past the edges of the paper sheaf 30. Therefore, even if the paperclip 2 is located on a side of the paper sheaf 30, it can still be removed when the removal bar 50 contacts the paperclip 2. Additionally, in some embodiments, the portion of the paper sheaf 30 with the paperclip 2 will be oriented in a specific direction; e.g. the top edge of the paper sheaf 30 with the paperclip will be positioned in a forward-facing direction. In other embodiments, the paper sheaf 30 could be oriented on the lifting tray 40 in any direction. In such embodiments, the paper sheaf 30 could be reoriented on the lifting tray 40 in order to place the paper sheaf 30 and paperclip 2 in a forward-facing direction. To accomplish this, lifting tray 40 could be rotatable in order to orient the paper sheaf and paperclip. However, in an alternative embodiment, the removal bar 50 could operate in both a forward and a reverse direction, thereby allowing paperclip 2 to be pushed off of the paper sheaf 30 in either direction.

It will also be noted that in order for the removal bar 50 to effectively contact paperclip 2 and push it off of the paper sheaf 30, at least part of paperclip 2 must be on an outer sheet of paper within the paper sheaf itself. Further, if sheaf 30 with paperclip 2 is placed on lifting tray 40 in a face-down orientation, so that a part of the paperclip is not exposed in an upwards direction, a known mechanism may be employed to flip the paper sheaf 30 over (not shown).

Figure 3A:
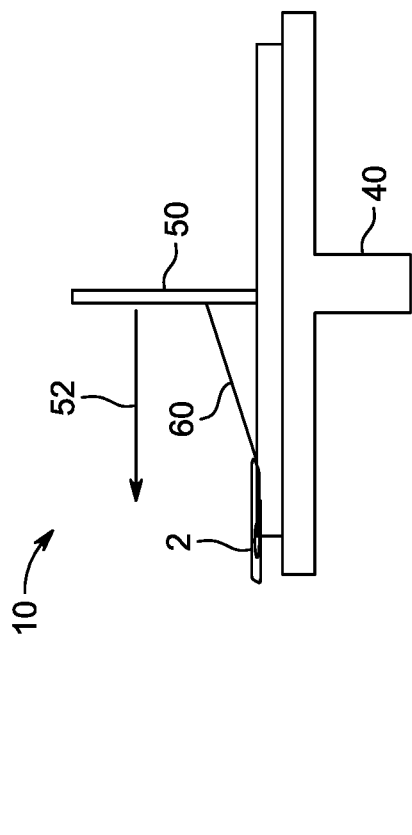
FIGS. 3A-3D show a sequence of removing a paperclip from a sheaf of papers according to a first embodiment.
Figure 3B:
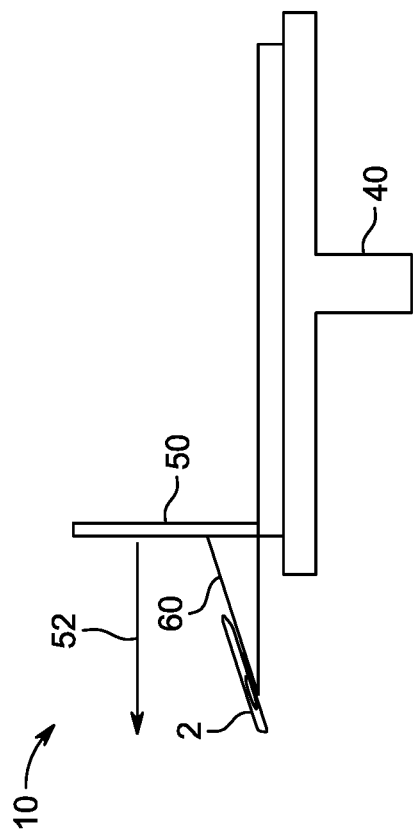
Figure 3C:
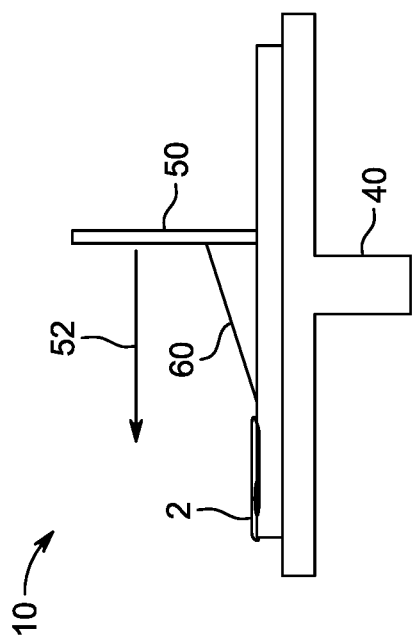
Figure 3D:
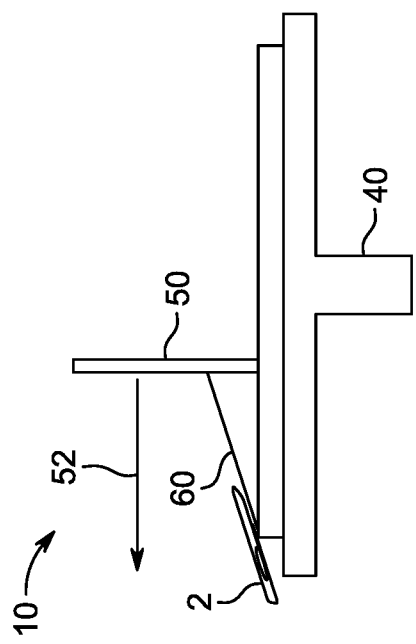

FIGS. 3A-3D show the paperclip removal process as removal bar 50 with pusher plate 60 moves across paper sheaf 30. In FIG. 3A, removal bar 50 with pusher plate 60 begins moving across paper sheaf 30 toward paperclip 2 in direction 52. In FIG. 3B, removal bar 50 with pusher plate 60 has shifted toward paperclip 2 and the edge of the pusher plate closest to paperclip 2 is just in contact with paperclip 2. In FIG. 3C, removal bar 50 with pusher plate 60 has shifted toward paperclip 2 in direction 52 and the edge of the pusher plate closest to paperclip 2 has slid underneath the exposed portion of paperclip 2 such that paperclip 2 clamps down on pusher plate 60 rather than paper sheaf 30. In FIG. 3D, removal bar 50 with pusher plate 60 has shifted, along with paperclip 2 which is being pushed by the edge of the pusher plate 60, in direction 52 such that paperclip 2 has been completely removed from paper sheaf 30.

Figure 4:
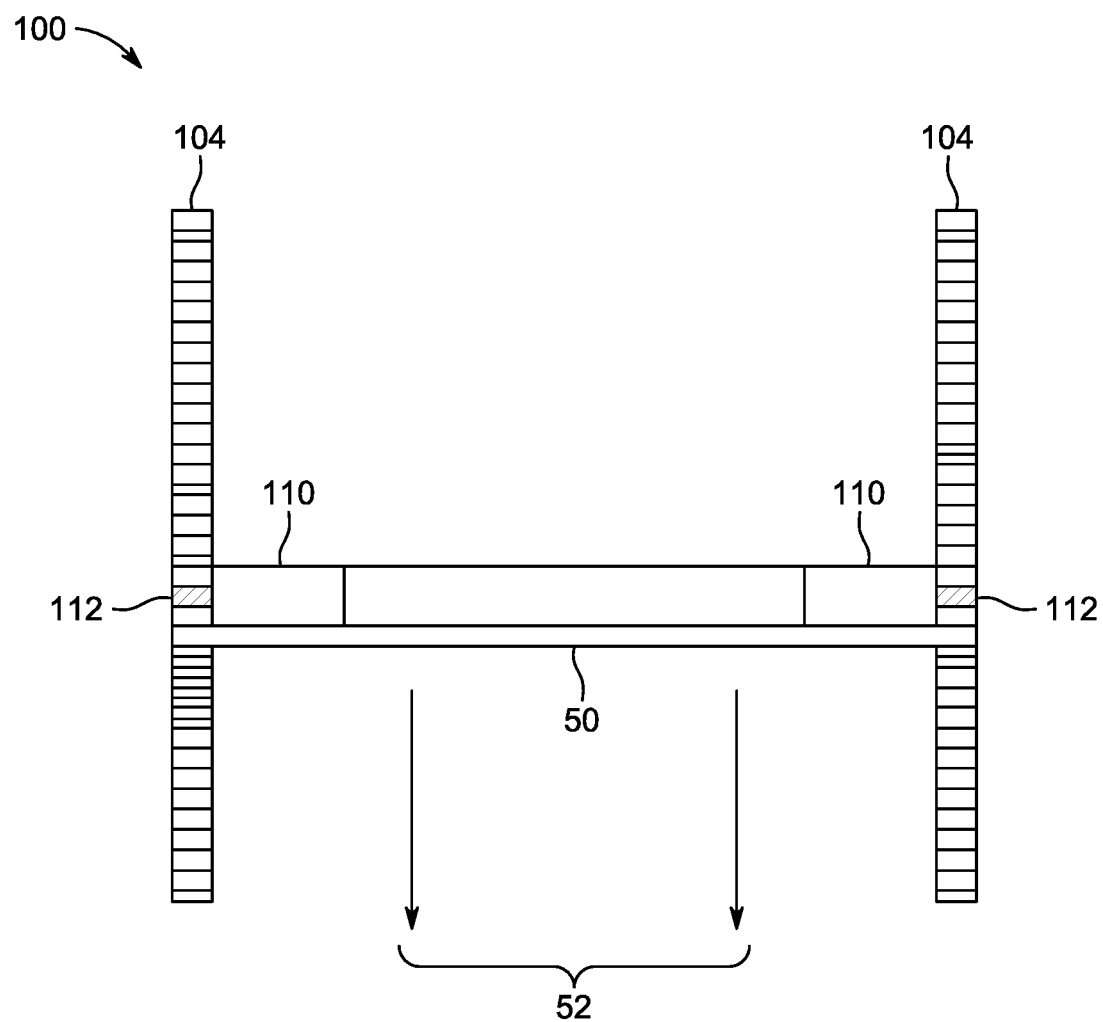
FIG. 4 shows a plan view of a movement assembly according to a first embodiment.

FIG. 4 shows a plan view of movement assembly 100, according to the first embodiment of the disclosure. In FIG. 4, ridge rails 104 are located in a position parallel to direction 52. In a typical configuration, the ridge rails 104 are located in parallel to the long side of the sheaf of papers located in lifting tray 40. For example, for an 8.5 by 11-inch sheaf of papers, the ridge rails 104 will be parallel with the 11-inch side of the papers. However, this is not necessary and the ridge rails 104 can be parallel with the 8.5-inch side of the sheaf. Both proximal ends of removal bar 50 extend to ridge rails 104 as shown in FIG. 4. However, the removal bar could be longer or shorter than the width between ridge rails 104. As the removal bar 50 holds the pusher plate 60, the removal bar 50 could have any number of widths as long as the pusher plate 60 can be securely fixed to it. The pusher plate 60 could also have a number of widths, including being wider than the widest width of paper from which a paperclip is to be removed. That is, using an 8.5 by 11-inch sheet of paper as an example, the pusher plate 60 would typically be over 8.5 inches wide in order to cover the entire width of the paper. Removal bar 50 is attached to a movement mechanism and is configured so that the removal bar can travel along the ridge rails 104 and track rails 202 (shown in FIGS. 5A and 5B). This can be accomplished with a ball bearing mechanism, or other low friction mechanism as discussed in FIGS. 5A and 5B.

A movement mechanism, such as one or more electric motors 110 can be used to drive removal bar 50. While two motors 110 are shown in FIG. 4, utilizing a single motor 110 to move removal bar 50 can also be implemented. Motors 110 can be AC or DC motors and can be servo motors, stepper motors, linear motors, or the like. Motors 110 can include motor shafts 112 which extend over ridge rails 104. As will be discussed below, motors 110 with motor shafts 112 can propel removal bar 50 in a forward or backwards direction, as explained with regard to FIGS. 3A-3D. The motors 110 can optionally be connected to an upper vertical shaft portion of removal bar 50, similar to what was described above with regard to the positioning and orientation of pushdown bar 20.

Figure 5A:
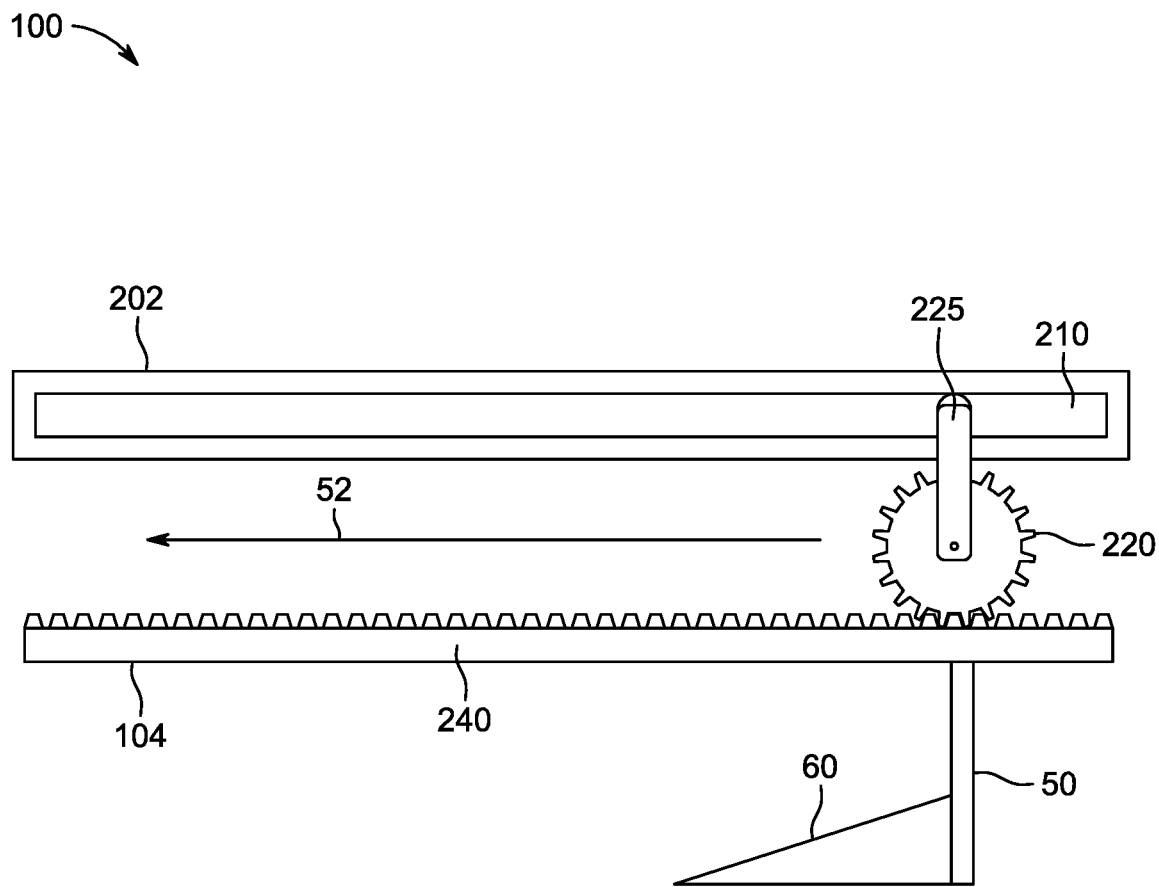
FIG. 5A shows a side view of a movement assembly according to a first embodiment.

FIG. 5A is a side view of movement assembly 100 and depicts an exemplary means of propelling removal bar 50, together with pusher plate 60, according to the first embodiment of the disclosure. From the side perspective, ridge rail 104 can been seen to include angular ridges 240 on an edge opposite to removal bar 50. Gear 220 is attached to motor shaft 112 of motor 110, with cogs commensurate in size and shape with the angular ridges 240. Gear 220 moves along ridge rail 104 in movement direction 52.

Gear 220 is also connected to roller 210 which is located above gear 220 and which rests in track rail 202. Roller 210 in track rail 202 can provide additional stability to the removal bar 50 as it travels back and forth. Gear 220 has a connection portion 225 which is attached to a gear axle (not shown). The connection portion 225 is connected to the track rail 202 via a roller 210. The roller 210 could be a wheel or ball bearing or the like and may not be motorized. However, the disclosure is not limited to this configuration, and track rail 202 could be positioned outside of ridge rail 104 so that the track rail 202 and ridge rail 104 are coplanar in a horizontal direction.

Gear 220 is connected to removal bar 50 through one or more motor shafts 112 (shown in FIG. 4). In the process of moving the removal bar 50, motor 110 rotates motor shaft 112 which in turn rotates gear 220. As gear 220 rotates, the cogs on gear 220 catch on angular ridges 240 and consequently drive gear 220 along ridge rail 104 in movement direction 52. Gear 220 is stabilized by roller 210 along track rail 202. As gear 220 moves along ridge rail 104, removal bar 50 with pusher plate 60 are propelled in movement direction 52, toward a paperclip 2 (not shown in FIG. 4).

Figure 5C:
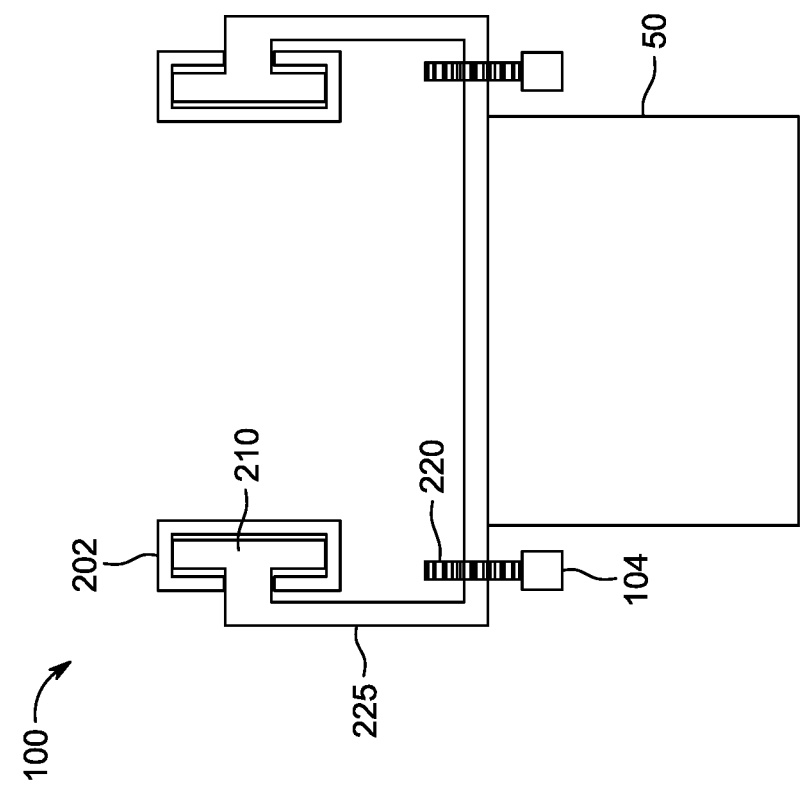
FIG. 5C shows a front view of a movement assembly according to a first embodiment.
Figure 5B:
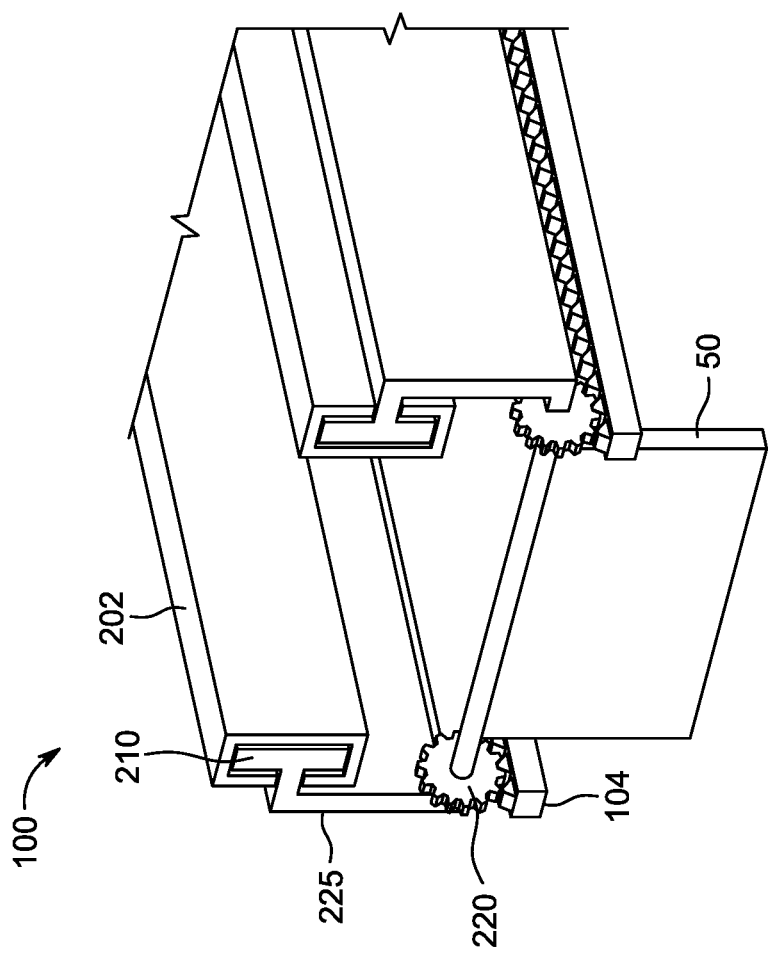
FIG. 5B shows a perspective view of a movement assembly according to a first embodiment.

FIG. 5B is a perspective view of movement assembly 100 and FIG. 5C is a front view of movement assembly 100 as shown in FIG. 5A. From this perspective it can be seen that connection portion 225 is attached to gear 220 and roller 210 at both proximal ends. The connections between connection portion 225 and gear 220 and roller 210 may be provided at right angles, or near thereto, or may be connected in different configurations as necessitated by system specifications and design requirements. Additionally, from this perspective it can be seen that roller 210 fits substantially in track rail 202, but it is also envisioned that roller 210 may be connected in other ways.

Figure 6A:
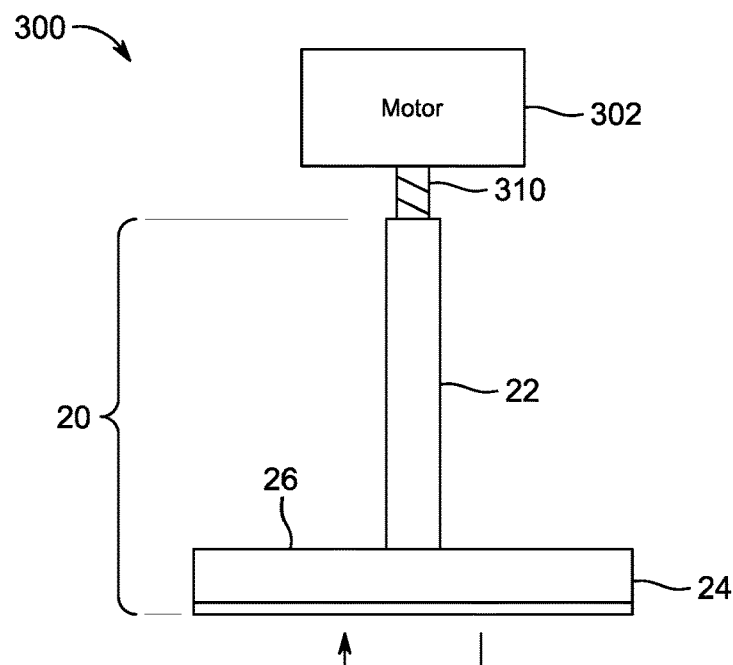
FIG. 6A shows a pushdown bar assembly in a retracted state.

FIG. 6A provides a detailed side view of pushdown bar 20 according to the first embodiment. FIG. 6A provides a detailed view of a pushdown bar assembly 300 in a retracted state. From this perspective, pushdown bar 20 can be seen to include vertical shaft 22 connected to plate 24 which is connected to lining 26. Vertical shaft 22 may be cylindrical, rectangular, or otherwise, and can be made in any dimension necessary to satisfy system requirements. Similarly, plate 24 may also be made in any dimension necessary to satisfy system requirements as long as it is capable of stabilizing paper sheaf 30 throughout the paperclip removal process. In one embodiment, vertical shaft 22 and plate 24 are composed of aluminum or steel, though other materials can be used to satisfy design requirements. Lining 26 is preferably shaped to be commensurate with the bottom of plate 24 and preferably composed of a foam or rubber that is capable of stabilizing paper sheaf 30 without damage.

Motor 302 is shown as an exemplary means of moving pushdown bar 20 according to a first embodiment. As shown in FIG. 6A, motor 302 is attached to corkscrew shaft 310 which extends into vertical shaft 22. As motor 302 rotates corkscrew shaft 310, vertical shaft 22, and, consequently, all of pushdown bar 20 move vertically, in a direction depending on the direction of rotation of corkscrew shaft 310. In another embodiment, instead of using a motor and a corkscrew shaft, a piston, solenoid, or other similarly suited mechanism could be used.

Figure 6B:
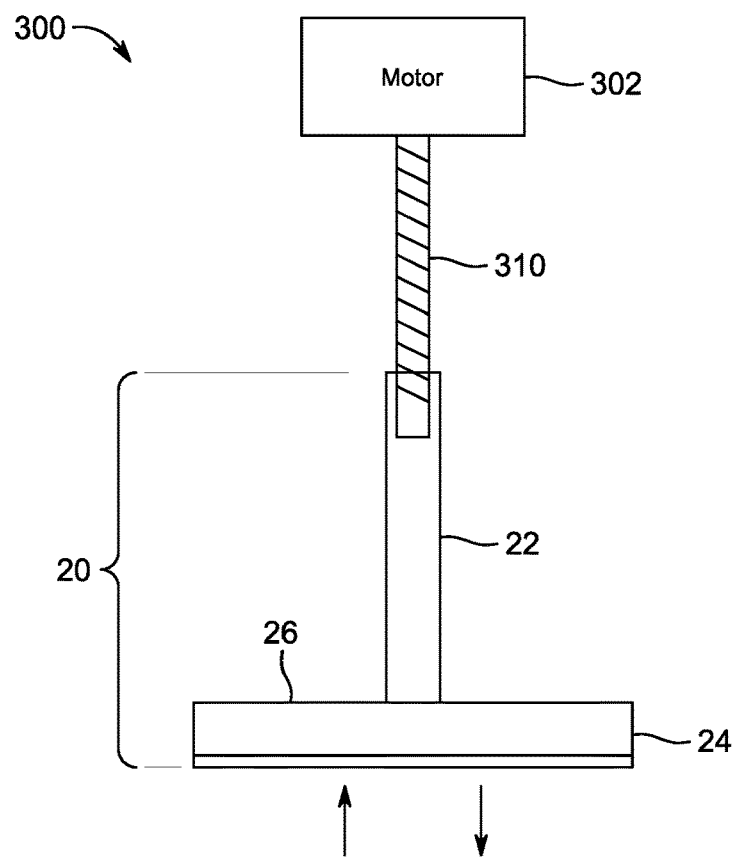
FIG. 6B shows a pushdown bar assembly in an extended state.

FIG. 6B provides a detailed view of a pushdown bar assembly 300 in an extended state. In this extended state, pushdown bar 20 can be lowered to contact paper sheaf 30 to securely hold it in place. As the size of the sheaf 30 can vary depending on the number of papers and thickness of each sheet, the pushdown bar 20, controlled by circuit 1500, can extend to the proper distance to apply the correct amount of pressure to sheaf 30.

Figure 7:
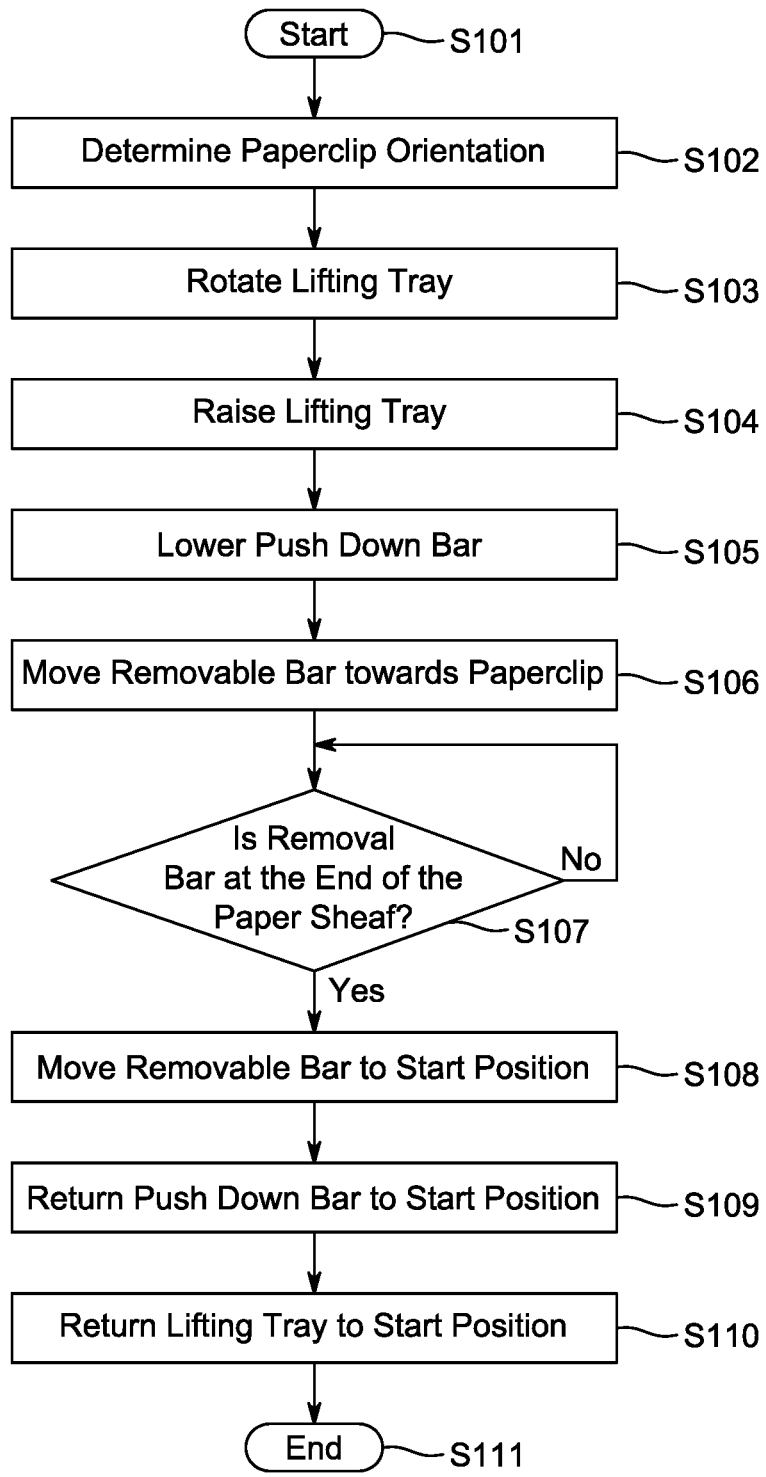
FIG. 7 shows a flowchart of how a first embodiment of the disclosure operates.

FIG. 7 provides a flow chart of the paperclip removal process according to the first embodiment of the disclosure. In this embodiment, in step S101 the paperclip removal process is initiated, and a sheaf of paper is placed on the paper lifting tray either by human intervention or automated means as discussed above.

Steps S102 and S103 are optional steps that may be implemented, depending on the specific implementation of the paperclip removal system 10. In S102, a determination is made as to where on a sheaf of paper 30 the paperclip 2 is located. This can be accomplished through an optical sensor 67, together with image recognition software executed by the control circuit 1500. For example, a neural network could be used to determine if and where a paperclip is located on the sheaf of papers. This image may also be used at the completion of the process to indicate whether removal bar has reached a location and whether the paperclip has been successfully removed, by comparing the earlier image a second image taken after the removal bar 50 has reached the end of the paper sheath 30.

Next, in optional step S103, sheaf of papers 30 in lifting tray 40 can be rotated so that the edge of the sheaf of papers with the paperclip 2 is located in a forward-facing direction. A forward-facing direction means that the paperclip is located along the direction of forward movement of the removal bar 50. Thus, the rotation of the lifting tray 40 in order to properly orient the paperclip 2 in a forward-facing direction allows a simple linear movement of the removal bar 50 to remove paperclip 2. Without these optional steps S102 and S103, the sheaf of papers 30 should be placed such that the paperclip is already located in a forward-facing direction.

In step S104, paper lifting tray 40 is raised into the appropriate position for paperclip removal. In one embodiment, the lifting tray 40 is lifted until the top of the sheaf of papers 30 makes contact with the bottom of the removal bar 50. The lifting tray 40 may have a motor that lifts it into position and when a threshold amount of resistance is felt in the motor, a determination may be made that the sheaf of papers 30 is in the proper position.

In step S105, the pushdown bar 20 is lowered until it contacts the sheath of paper 30. The pushdown bar 20 can be lowered with a corkscrew device operated by a motor. When a threshold amount of resistance is felt in the motor, a determination may be made that the pushdown bar is applying the correct amount of pressure to the sheaf of papers 30.

In step S106, the removal bar 50 begins moving toward the paperclip 2. The removal bar 50 will continue to move toward the paperclip 2 until it has reached the end of the sheaf of papers 30, as shown in step 107. The removal bar 50 can be configured to travel slightly past the edge of the sheaf of papers 30 in order to ensure that the paperclip 2 is fully removed. If the removal bar 50 has not reached the end of the paper sheaf 30, then it will continue moving. A determination as to whether the removal bar 50 has reached the end of the paper sheath 30 can be obtained in a variety of ways including, for example, an optical sensor 70 or 67, as shown in FIG. 1, to detect the location of the removal bar 50 or paperclip 2. Alternatively, a mechanical means for stopping the removal bar 50, once it is past the end of the paper sheath 30, or catching the paperclip 2, can also be implemented.

Once the removal bar 50 has reached the end of the paper sheaf 30, it can be assumed that the paperclip 2 has been removed from the sheaf of papers 30 and in step S108, the removal bar 50 is returned to its resting position.

In step S109, the pushdown bar 20 is raised and returned to its resting position.

In step S110, the paper lifting tray 40 is returned to its resting position and in step S111, the paperclip removal process is completed.

Figure 8A:
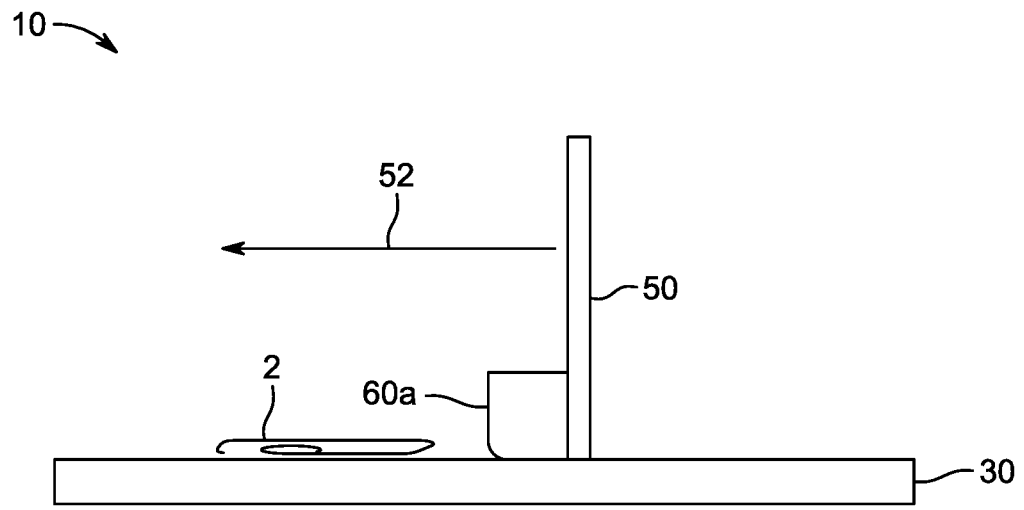
FIGS. 8A and 8B show a second embodiment of the disclosure.
Figure 8B:
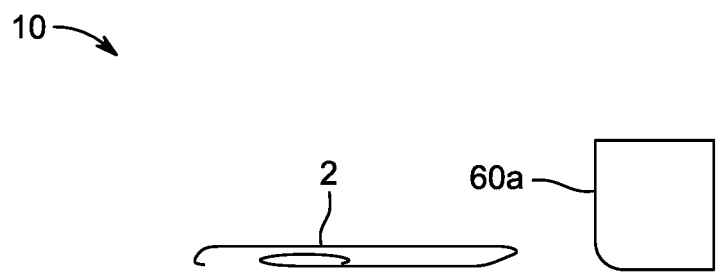

FIGS. 8A and 8B illustrate other possible embodiments of pusher plate, shown by reference character 60a. In FIGS. 8A and 8B, pusher plate 60a may have a beveled or curved edge that may help to avoid binding on, gripping, or ripping paper sheaf 30 as it travels across the plate. As shown in FIG. 8B, the pusher plate 60a has a curved edge, where the top part of the curved edge is still lower than the thickness of the paperclip 2. This is to ensure that the pusher plate 60a does not travel over the paperclip 2, while still avoiding binding on the paper sheaf 30.

Figure 9A:
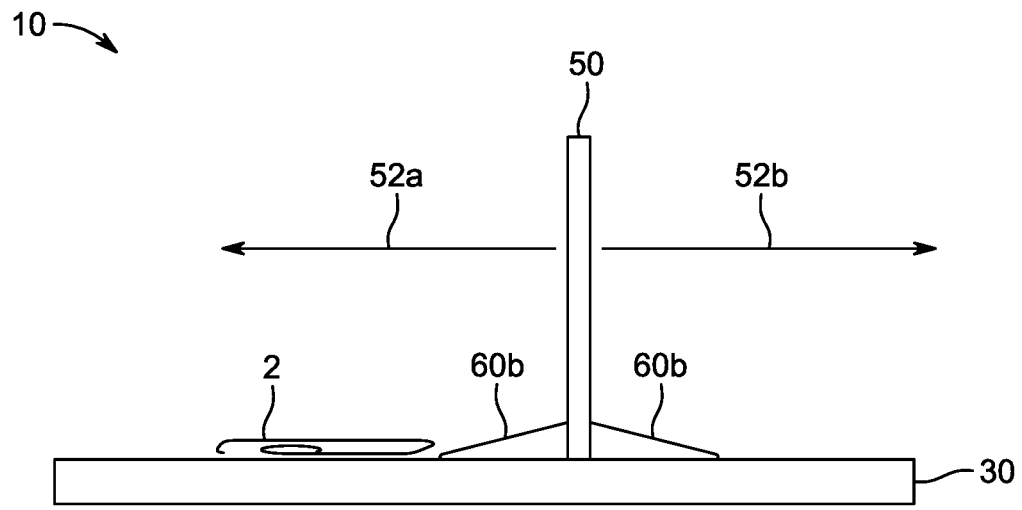
FIGS. 9A and 9B show a third embodiment of the disclosure.
Figure 9B:
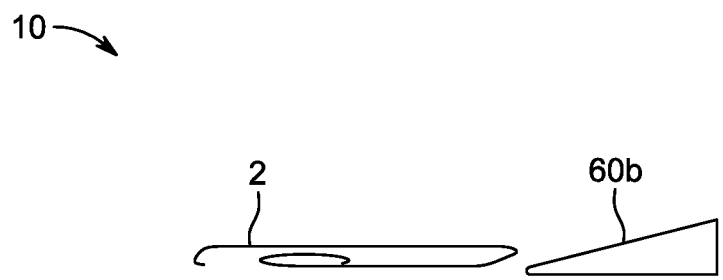

In FIGS. 9A and 9B, removal bar 50 includes a plurality of pusher plates, shown by reference character 60b. In this configuration, the paperclip removal system 10 may be capable of removing paperclips from different edges of paper sheath 30 by moving in either direction 52a or 52b, thus eliminating the need to reorient the paper sheaf 30 in paperclip removal system 10. Removal bar 50 may include more than two pusher plates 60a and 60b so as to be able to remove a paperclip 2 while traveling in either of directions 52a or 52b. Further, pusher plate 60b could be circular, with a triangle shaped cross-section. Accordingly, removal bar 50 is capable of removing paperclips 2 in a plurality of coplanar directions.

In yet another embodiment of the disclosure, removal bar 50 can also be rotated, such that the paperclip can be removed regardless of the orientation of the paperclip 2 on the sheaf of papers 30.

Additionally, the system may optionally include a feature to determine when the paperclip removal process is complete. This could be accomplished via an optical sensor 67 or 70, or a combination thereof, to determine when the paperclip is removed and/or when the removal bar has reached the end of the paper. This could also be accomplished via mechanical means including a device to catch removed paperclips or a mechanical stop to prevent the removal bar from extending further than necessary to remove the paperclip.

Figure 10:
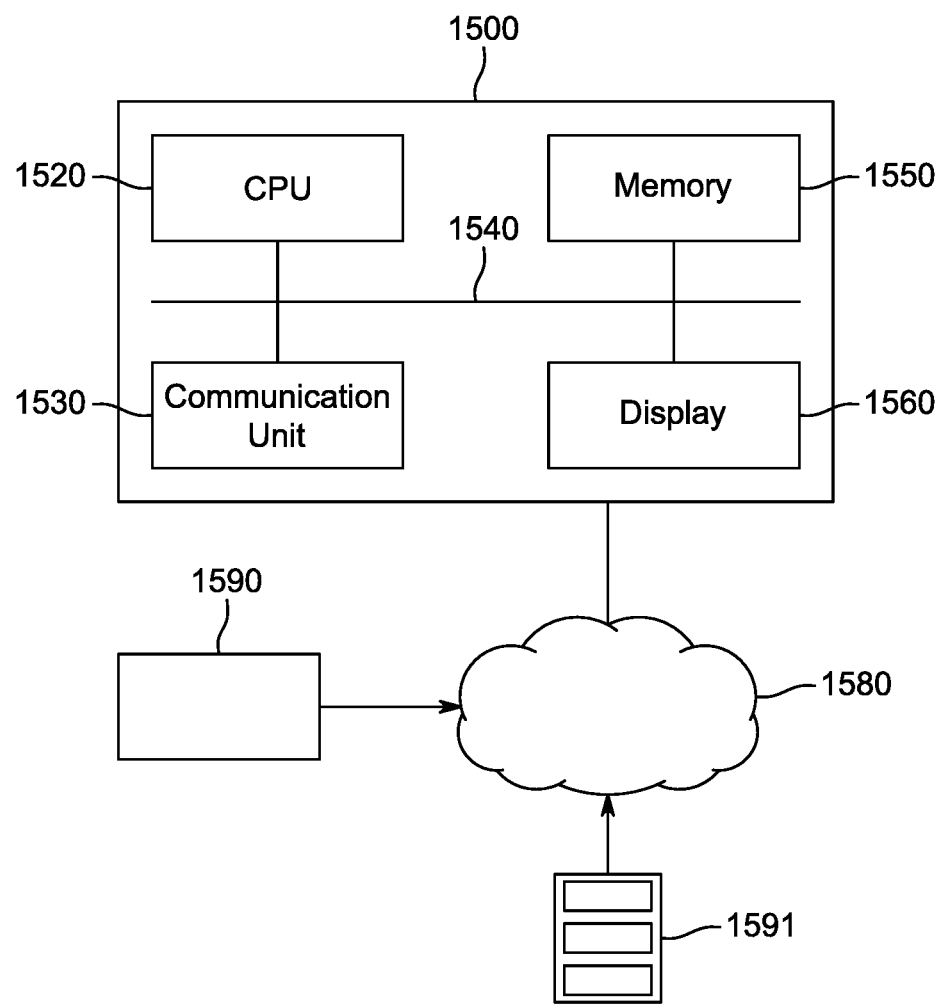
FIG. 10 shows a control circuit which can control various embodiments of the disclosure.

FIG. 10 illustrates an example of a control circuit 1500 that can be used in a scanner and used to control the paperclip removal system 10, according to an embodiment of the present disclosure. The control circuit can be implemented on a computer, or scanner. The control circuit 1500 and can control the scanner and elements of the paperclip removal system 10, including the lifting tray 40, pushdown bar 20, movement assembly 100, and optical sensor 67.

FIG. 10 is a diagram of example components of the control circuit 1500 which may be used to implement one or more aspects of the paperclip removal system 10. The control circuit 1500 may be networked to another computing system 1590 via a network 1580, such as the Internet or a local area network (LAN). The control circuit 1500 can include a CPU 1520, memory 1550, communications unit 1530, display 1560, all connected via a bus 1540. It is noted that one or more control circuits 1500 can be used to implement various aspect of the disclosure, or the entire disclosure.

The control circuit 1500 can be implemented by one or more scanners, or various forms of digital computers, such as laptops, desktops, workstations, servers, blade servers, mainframes, and other appropriate computers. The components shown here, their connections and relationships, and their functions, are meant to be examples only, and are not meant to limit embodiments of the disclosure described and/or claimed in this document.

The components of the control circuit 1500 are each interconnected using various busses and may be mounted on a common circuit board or in other ways as appropriate. The central processing unit 1520 can process instructions for execution within the control circuit, including instructions stored in the memory or other storage device, to display graphical information on a display. In other embodiments, multiple processors and/or multiple buses may be used, as appropriate, along with multiple memories and types of memory. Also, multiple control circuits may be interconnected.

The central processing unit 1520 may be implemented as an integrated circuit that includes separate and/or multiple analog and digital processors. Additionally, the CPU may be implemented using any of several architectures. For example, the processor may be an x86 processor, or an RISC (reduced instruction set computer) processor. The processor may coordinate with the other components of the device, such as control of user interfaces, applications run by the device, and wireless communication. Multiple processors or processors with multiple cores may also be used. The processor is primarily responsible for performing the functions discussed in this document, however, a GPU may also be used.

The processor may communicate with a user through a control interface and display interface coupled to a display. The display may be, for example, an LCD (liquid crystal display) display, or other appropriate display technology. The display interface may comprise suitable circuitry for driving the display to present graphical and other information to a user. The control interface may receive commands from a user and convert them for submission to the processor. In addition, an external interface may be provided in communication with a processor to enable near field communication with other devices. An external interface may be provided, for example, for wireless and/or wired communication. Multiple interfaces may also be used.

Input to the control circuit 1500 may be done with a personal computer, server, or other computing device 1590.

The CPU 1520 operates according to a program stored in memory 1550. The CPU 1520 controls the communication unit 1530 and the display 1560. The program may be provided through the network 1580 which may be the Internet, or provided by being stored in a computer-readable information storage medium such as a DVD-ROM or a USB memory.

The memory 1550 includes, for example, a memory device such as a RAM or a ROM, and a hard disk drive. The memory 1550 stores the program. The memory also stores information or computational result input from each unit.

The communication unit 1530 can be a network card which is configured to communicate with other devices, such as a web server or other computers. The communication unit 1530 inputs information received from other devices into the CPU 1520 or the memory 1550 based on the control of the CPU 1520 and sends the information to other devices.

The bus 1540 is configured to send or receive data with the CPU 1520, memory 1550, the communication unit 1530, and the display 1560. For example, the CPU 1520 or memory 1550 is connected to the display 1560 through an expansion bus in the bus 1540.

The in-device memory can be composed of a DRAM. The in-device memory is connected to the CPU 1520 and the memory 1550 through the bus 1540. The high-speed memory is composed of, for example, a SRAM that is capable of higher speed access than the in-device memory.

The control circuit 1500, which controls a scanner, can be part of a document processing system. For example, documents which contain paperclips, can be input into the scanner, and once the documents have any paperclips removed, the documents can be scanned/digitized and saved to an internal memory 1550 or external memory 1591. Once stored in memory, the documents could be processed or manipulated in any number of ways.

An example of an external memory 1591 could be another computer/server which is connected to the scanner directly or through a network. Further, the external memory 1591 could be cloud storage, for example. While FIG. 10 shows the external memory 1591 connected to the control circuit 1500 through network 1580, the external memory 1591 could also be directly connected to the control circuit 1500.

The document processing system could intake reams of documents, which could include paperclipped documents, and scan each document without needing a human being to remove the paperclips beforehand. As mentioned previously, the system could be used to digitize hospital records, for example.

Figure 11A:
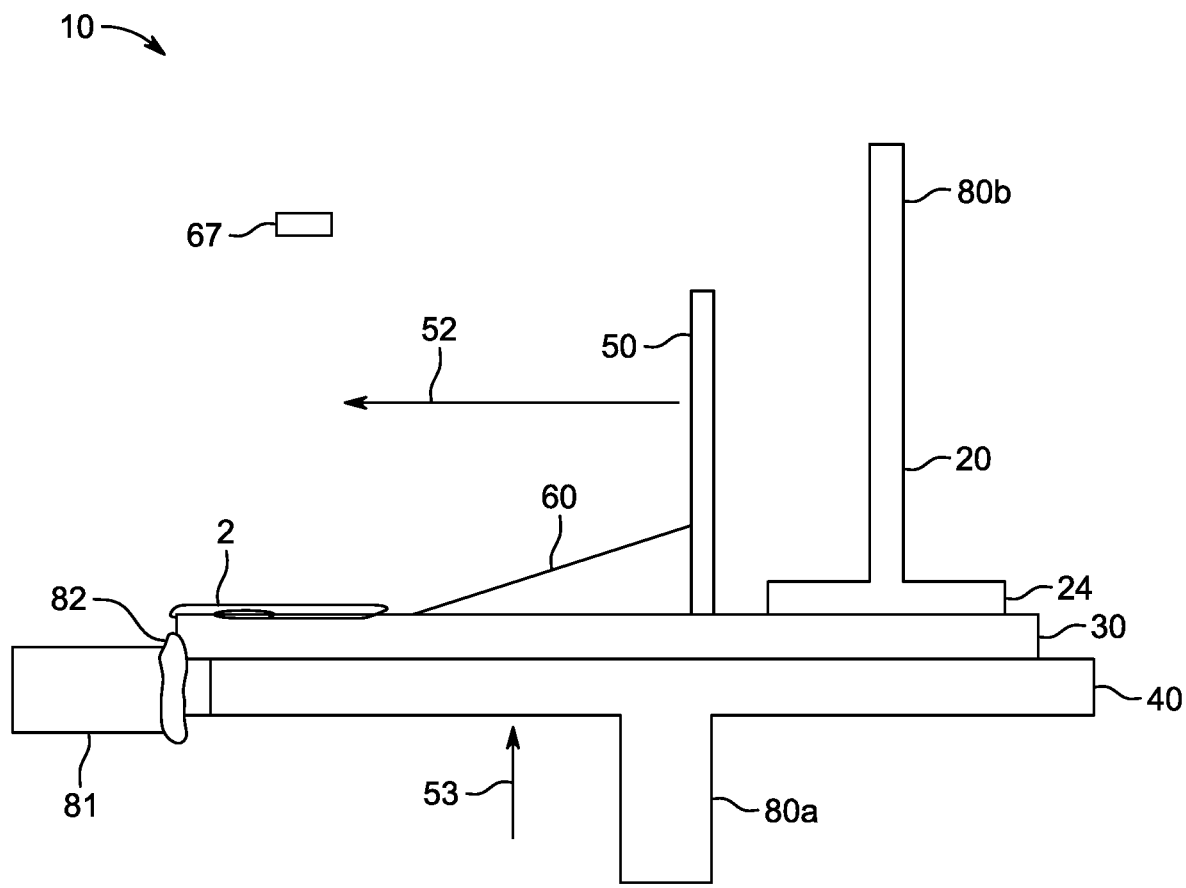
FIGS. 11A and 11B show a fourth embodiment of the disclosure.
Figure 11B:
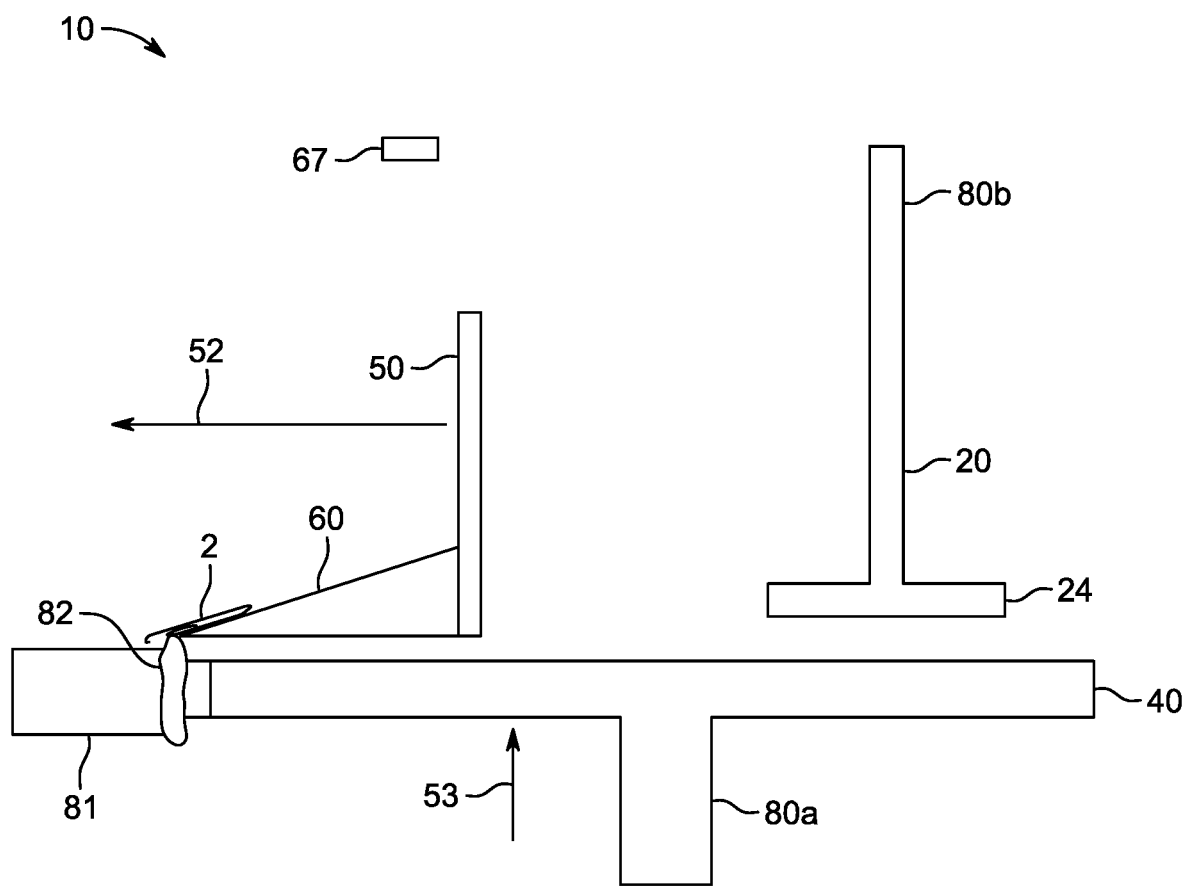

FIGS. 11A and 11B depict another embodiment of the disclosure where paperclip 2 is removed from pusher plate 60 by container 81 including lip 82. For example, if the system is designed for paperclip 2 to compress onto pusher plate 60 rather than be pushed off of paper sheath 30, paperclip 2 may be removed from the pusher plate 60 by a container 81 with a lip 82 designed to catch paperclip 2 such that when removal bar 50 is returning to its original position, the lip 82 will catch the edge of paperclip 2 and will deposit paperclip 2 into container 81.

As shown in FIG. 11A, during the paperclip removal process, container 81 is positioned in a location so as not to interfere with paperclip removal. In this example, container 81 is located below paperclip 2 and lip 82 is positioned on the portion of container 81 closest to paperclip 2. In FIG. 11B, paperclip 2 has already been removed from paper sheaf 30 and paper sheaf 30 has moved to the next stage of processing. From this perspective, it can be seen that container 81 has been raised such that lip 82 catches on the outer ring of paperclip 2. Subsequently, removal bar 50 moves in reverse direction 52 and, consequently, paperclip 2, which is caught on lip 82, will be pulled off of pusher plate 60 and then fall into container 81.

It is also envisioned that paperclip 2 may be removed from removal bar 50 by other means. For example, a paperclip removal bar could be utilized to release paperclip 2 from pusher plate 60. In such an embodiment, the paperclip removal bar could push paperclip 2 off pusher plate 60 and drop paperclip 2 directly into container 81 or onto another component, i.e. a conveyor belt, to send paperclip 2 to container 81.

In other embodiments, it is envisioned that container 81 could be located elsewhere within the system. For example, container 81 could be stored further from the paperclip removal system 10 and moved into position as needed. This could be done by using a motor or solenoid, or other type of movement mechanism (not shown). Additionally, it is also envisioned that container 81 may be located elsewhere in the system, and removal bar 50 with pusher plate 60 may be moved, using a motor or solenoid, or other type of movement mechanism (not shown), to container 81 and lip 82.

A number of embodiments of the disclosure have been described. It should be understood that various modifications may be made without departing from the spirit and scope of the disclosure. For example, various forms of the flows shown above may be used, with steps re-ordered, added, or removed. Also, although several embodiments of authorizing a remote terminal or mobile device have been described, it should be recognized that numerous other applications are contemplated. Accordingly, other embodiments are within the scope of the following claims.

What is claimed is:

1. A scanner comprising:
    a paper lifting tray operable to move a sheaf of papers in an upward vertical direction;
    a pushdown bar configured to move in a vertical direction and make contact with the sheaf of papers on the paper lifting tray and apply a force in a downward direction and against the paper lifting tray, the force being sufficient to hold the sheaf of papers in place; and
    a removal bar configured to move in a direction that is coplanar with the paper lifting tray and orthogonal to the vertical direction,
    wherein the removal bar is further configured to come into contact with the sheaf of papers and push a paperclip off of the sheaf of papers.

2. The scanner according to claim 1, further comprising:
    an image recognition system configured to identify if and where a paperclip is located on the sheaf of papers.

3. The scanner according to claim 2, wherein the paper lifting tray is configured to rotate.

4. The scanner according to claim 3, wherein the paper lifting tray is rotated so that the paperclip identified by the image recognition system is positioned in a forward-facing direction.

5. The scanner according to claim 1, wherein the removal bar includes an upper vertical shaft portion attached to a motor configured to drive the removal bar in the forward-facing direction and in a reverse direction.

6. The scanner according to claim 5, wherein the motor is further attached to a motor shaft attached to a gear.

7. The scanner according to claim 6, further comprising:
    a ridge rail which includes ridges commensurate in size and shape with cogs of the gear, wherein the gear is located on at least one ridge rail.

8. The scanner according to claim 7, wherein:
    the gear is also attached to a non-motorized roller configured to stabilize the removal bar.

9. The scanner according to claim 1, further comprising:
    a sensor to indicate when the removal bar has traveled to a location indicating that the paperclip has been removed from the sheaf of papers.

10. The scanner according to claim 9, wherein the sensor is an optical sensor.

11. The scanner according to claim 1, wherein the removal bar further comprises a pusher plate configured to be inserted between the paperclip and the sheaf of papers.

12. The scanner according to claim 11, wherein the removal bar is further configured to remove paperclips in a plurality of coplanar directions.

13. A method for removing paperclips from a sheaf of papers by a scanning system with an automatic paperclip remover, the method comprising:
    initiating the paperclip removal method once a sheaf of papers is positioned on a lifting tray of the scanner;
    raising the lifting tray until it reaches a position for paperclip removal;
    lowering a pushdown bar until it contacts the sheath of papers;
    moving a removal bar toward the paperclip until it has reached the end of the sheaf of papers;
    returning the removal bar to its original position;
    returning the pushdown bar to its original position; and
    returning the paper lifting tray to its original position,
    scanning the sheaf of papers to obtain a digital copy of the information on the sheaf of papers, and
    saving the digital copy of the information on the sheaf of papers to memory.

14. The method according to claim 13 further comprising:
    identifying where on a sheaf of paper the paperclip is located, using a camera or optical sensor device together with image recognition software.

15. The method according to claim 14 further comprising:
rotating the sheaf of papers so that an edge of the sheaf of papers with the paperclip is located in a forward-facing direction.

16. A scanner comprising:
a paper lifting tray operable to move a sheaf of papers in a vertical direction;
a pushdown bar configured to move in the vertical direction and make contact with the sheaf of papers on the paper lifting tray and apply a force in a downward direction against the lifting tray, the force being sufficient to hold the sheaf of papers in place;
a removal bar configured to move in a direction that is coplanar with the paper lifting tray and orthogonal to the vertical direction, wherein the removal bar is further configured to come into contact with the sheaf of papers and push a paperclip off of the sheaf of papers; and
a paperclip catching box with a lip, adjacent to the lifting tray.

17. The scanner according to claim 16, wherein the paperclip catching box with the lip is configured to remove a paperclip from the removal bar when the removal bar is retracted, thereby causing the paper to catch on the lip of the paperclip catching box.

18. The scanner according to claim 16, further comprising:
an image recognition system configured to identify if and where a paperclip is located on the sheaf of papers.

19. The scanner according to claim 18, wherein the paper lifting tray is configured to rotate.

20. The scanner according to claim 19, wherein the paper lifting tray is rotated so that the paperclip identified by the image recognition system positioned in a forward-facing direction.

* * * * *